United States Patent [19]
Yamauchi et al.

[11] Patent Number: 5,896,407
[45] Date of Patent: Apr. 20, 1999

[54] HIGH-EFFICIENCY PLASMA CONFINING METHOD, LASER OSCILLATING METHOD AND LASER OSCILLATOR

[75] Inventors: Toshihiko Yamauchi; Tomio Shiina, both of Naka-gun; Youichi Ishige, Higashiibaraki-gun, all of Japan

[73] Assignees: Japan Atomic Energy Research Institute, Tokyo; Miyama Co., Ltd., Ibaraki, both of Japan

[21] Appl. No.: 08/898,318

[22] Filed: Jul. 22, 1997

[30] Foreign Application Priority Data

Jul. 23, 1996 [JP] Japan ................... 8-193262

[51] Int. Cl.⁶ ........................................... H01S 3/00
[52] U.S. Cl. ........................ 372/2; 372/37; 372/73; 372/99; 505/180; 505/210
[58] Field of Search ......................... 372/2, 5, 37, 73, 372/55, 98, 99; 505/180, 210, 410; 331/82, 86, 94.1; 333/99 S, 99 PL; 335/216; 315/111.71, 111.81, 111.91

[56] References Cited

U.S. PATENT DOCUMENTS

| | | | |
|---|---|---|---|
| 3,961,197 | 6/1976 | Dawson | 372/5 |
| 4,152,625 | 5/1979 | Conard | 315/111.71 |
| 4,542,510 | 9/1985 | Black, Jr. | 372/2 |
| 5,048,025 | 9/1991 | Takemura | 372/2 |
| 5,410,558 | 4/1995 | Hackett | 372/2 |

*Primary Examiner*—Hemang Sanghavi
*Attorney, Agent, or Firm*—Wenderoth, Lind & Ponack, L.L.P.

[57] ABSTRACT

A high-efficiency plasma confining method, and a laser oscillating method of oscillating a laser, confine a plasma generated by entering a laser beam via an entry of a superconducting cylinder within the cylinder. The methods include the step of inhibiting diffusion or expansion in the radial or axial direction of the generated plasma by reducing the inside diameter of the cylinder between the entrance and an exit thereof. A magnetic line of force may be generated in the axial direction by winding a coil around the superconducting cylinder, to thereby confine the plasma. A laser oscillator for carrying out the method includes a superconducting cylinder, a supply mechanism for supplying a gas or a solid into the cylinder, and a laser irradiating mechanism. The inside diameter of the cylinder is reduced between an entry and an exit thereof, or the inside diameter of the cylinder is reduced at the entry and the exit thereof.

12 Claims, 5 Drawing Sheets

1

HIGH-EFFICIENCY PLASMA CONFINING METHOD, LASER OSCILLATING METHOD AND LASER OSCILLATOR

FIELD OF THE INVENTION

The present invention relates to a high-efficiency plasma confining method, a laser oscillating method based thereon, and a laser oscillator.

PRIOR ART

A plasma which is generally known as the fourth state of substance has been studied from various points of view because of the circumstances in which a mode covering a collective motion of a number of particles and a mode of individual motion including individual particles independently exerting mutual actions are intertwined in a complicated manner. Material processing at high temperatures using unique properties of plasma, plasma chemistry and other practical applications have therefore been widely carried out and development technology related thereto is actively conducted.

A plasma exhibits diverse and various behaviors under the effect of an electromagnetic field acting from outside. The effect of an internal electromagnetic field within a plasma generated by component particles themselves is also remarkable, and is characterized by behaviors which cannot be observed in any other state of substance.

While there exist many such plasmas in the natural world, natural plasmas cannot be utilized in a laboratory. It is therefore necessary to provide an apparatus which generates a plasma by some means or other and thus permits experimental or practical use thereof. In such an apparatus, a plasma comprising atoms or molecular ions of a required kind must be confined for generating and holding in response to a particular purpose. Because control parameters of generated plasma varies with the generating mechanism, various contrivances have been worked out for confining, including the magnetic field confining method and the inertia confining method.

In spite of these conventional efforts and contrivances, however, a plasma generated with a laser has in general a high density and a high temperature (up to $10^{21}$ cm$^{-3}$, from 20 eV to 2 keV), and confining is difficult by a method based on magnetic field.

Such a high-density and high-temperature plasma usually disappears through expansion, and it is difficult to hold it in a stable manner. Even for a low-temperature plasma (under 20 eV), the generated plasma is easily susceptible to a spontaneous distortion or strain, and suffers from a diffusion or expansion in the radial direction.

Under these circumstances, there has been an increasing demand for a method permitting efficient and stable confining of a plasma such as a high-density and high-temperature one generated with the use of a laser.

SUMMARY OF THE INVENTION

As means for solving these problems as described above, the present invention provides a high-efficiency plasma confining method of confining a plasma generated by entering a laser beam via an entry of a superconducting cylinder within the cylinder, which comprises the step of inhibiting diffusion or expansion in the radial direction of the generated plasma by reducing the inside diameter of the cylinder between the entry and an exit thereof, a high-efficiency plasma confining method of confining a plasma generated by entering a laser beam via an entry of a superconducting cylinder within the cylinder, which comprises the step of inhibiting diffusion or expansion in the axial direction of the generated plasma by reducing the inside diameter of the cylinder at the entry and an exit thereof, and the method as described above, which comprises the step of generating a magnetic line of force in the axial direction by winding a coil around the superconducting cylinder, thereby confining the plasma.

As a laser oscillating method made possible by the foregoing confining methods, the present invention provides a laser oscillating method of oscillating a laser by confining a plasma generated by entering a laser beam via an entry of a superconducting cylinder within the cylinder, which comprises the step of inhibiting diffusion or expansion in the radial direction of the generated plasma by reducing the inside diameter of the cylinder between the entry and an exit thereof, thereby confining the plasma at a high efficiency, a laser oscillating method of oscillating a laser by confining a plasma generated by entering a laser beam via an entry of a superconducting cylinder within the cylinder, which comprises the step of inhibiting diffusion or expansion in the axial direction of the generated plasma by reducing the inside diameter of the cylinder at the entry and at an exit thereof, thereby confining the plasma at a high efficiency, and the foregoing laser oscillating method, which comprises the step of generating a magnetic line of force in the axial direction by winding a coil around a superconducting cylinder, thereby confining a plasma.

In addition, the present invention provides also a laser oscillator comprising a superconducting cylinder, supply means of a gas or a solid into the cylinder, and laser irradiating means, wherein the inside diameter of the cylinder is reduced between an entry and an exit thereof, or the inside diameter thereof is reduced at the entry and the exit thereof, the foregoing laser oscillator wherein a coil is wound around the superconducting cylinder to form a mirror resonator, and also the foregoing laser oscillator wherein a mirror is arranged near each of the entry and the exit of the superconducting cylinder to form a mirror resonator.

BRIEF DESCRIPTION THE DRAWINGS

DETAILED DESCRIPTION OF THE INVENTION

In the present invention, diffusion or expansion of a generated plasma in the radial direction or in the axial direction is inhibited by utilizing a cylindrical superconductor as described above. Spontaneous distortion or strain of plasma is also prevented. This means that the plasma can be aligned with the axis. This in turn makes it possible to oscillate a laser of a short wavelength at a high efficiency.

Now, embodiments of the present invention will be described below further in detail. It is needless to mention that the present invention is not limited to these embodiments.

Embodiment 1

Figure 1:
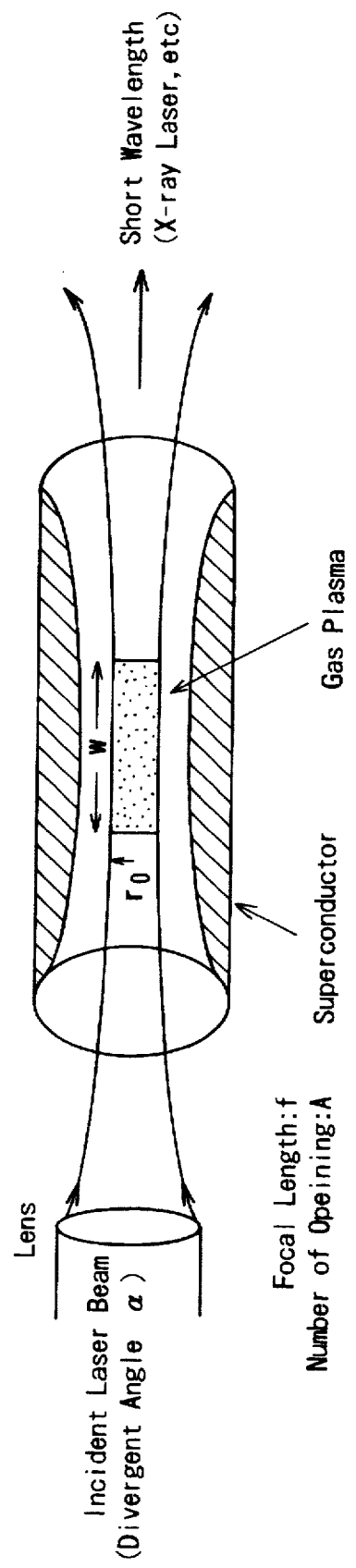
FIG. 1 is a conceptual diagram illustrating the fundamental configuration of the high-efficiency plasma confining based on a cylindrical superconductor and the laser oscillator of the present invention.

FIG. 1 illustrates a fundamental configuration of a high-efficiency plasma confining laser oscillator based on a cylindrical superconductor of the present invention. An incident laser beam having a divergent angle a is irradiated into a gas in the cylinder after being appropriately stopped through a lens having a focal length f and a number of openings A. In this case, a curvature of the inner wall of the cylinder is determined to match with the laser beam to be stopped. More specifically, in the high-efficiency plasma confining laser oscillator of the present invention, the inside diameter of the thinnest center portion of the cone should be, depending upon the focal radius of the incident laser, 100 μm on the minimum, and 5 mm on the maximum. This is no limitation on the outside diameter so far as the thickness of the cylinder is at least 1 mm. In such a cylindrical superconductor, the laser beam is irradiated into the gas in the cylinder to generate a plasma. The incident laser beam may be of a short pulse of nano, pico or femtosecond order or a repetition pulse, and any of various gases including a rare gas such as He may appropriately be selected as the gas in cylinder.

The generated plasma has initially a density of the order of that of the gas or the solid density, and a higher pressure leads to an earlier occurrence of expansion or diffusion. A self-magnetic field having been produced at this point cannot however enter into the superconductor under the influence of Meissner effect which is one of the fundamental properties of superconductivity. As a result, the magnetic field is confined in a space between the superconductor and the plasma, and compressed. The plasma is confined in the cylinder under the pressure of the compressed magnetic filed.

The generated plasma is a laser medium, and the inside diameter r0 and the length W are associated with the population inversion number (i.e., the laser output) of particles between two levels of the medium. More specifically, the generated gas plasma has a radius $r_0 = f\alpha$, a plasma length $W = 4Ar_0$, and a volume $V = 4\alpha Af^3\alpha^3$, and the distance from the cylinder inner wall depends upon the temperature and density of the plasma. When using a gas such as a rare gas, furthermore, it is possible to achieve a configuration improving the population inversion by forming a magnetic line of force in the axial direction by winding a coil around the cylindrical superconductor.

In the plasma generated in such a cylindrical superconductor, diffusion or expansion thereof in the radial direction or in the axial direction is inhibited, and distortion or strain is hardly caused, with correction thereof accomplished spontaneously. It is therefore possible to stable hold the plasma.

The plasma thus confined at a high efficiency is therefore further utilized for a laser oscillator. The inside diameter r0 of the plasma in this case is dependent on the incident laser intensity necessary for the saturation of the upper level of the oscillation transitions. A longer W at the point of saturation leads to a higher laser beam output.

Embodiment 2

Figure 2:
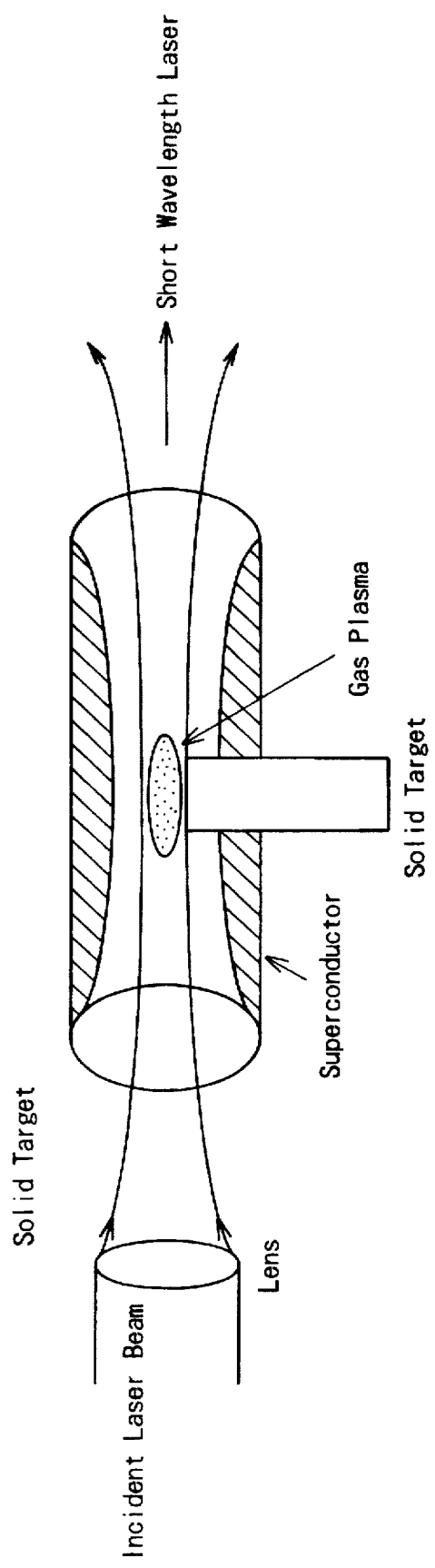
FIG. 2 is a conceptual diagram illustrating the fundamental configuration of the high-efficiency plasma confining using a solid target and the laser oscillator of the present invention.

FIG. 2 illustrates a fundamental configuration of the high-efficiency plasma confining laser oscillator of the present invention, using a solid target. This is applied in a vacuum by any of the following methods:

(1) Piercing a slender hole (or holes) at a center portion of the cylindrical superconductor, and inserting a target rod; and (2) Inserting a target along the inner surface, and irradiating a laser.

Embodiment 3

Figure 3:
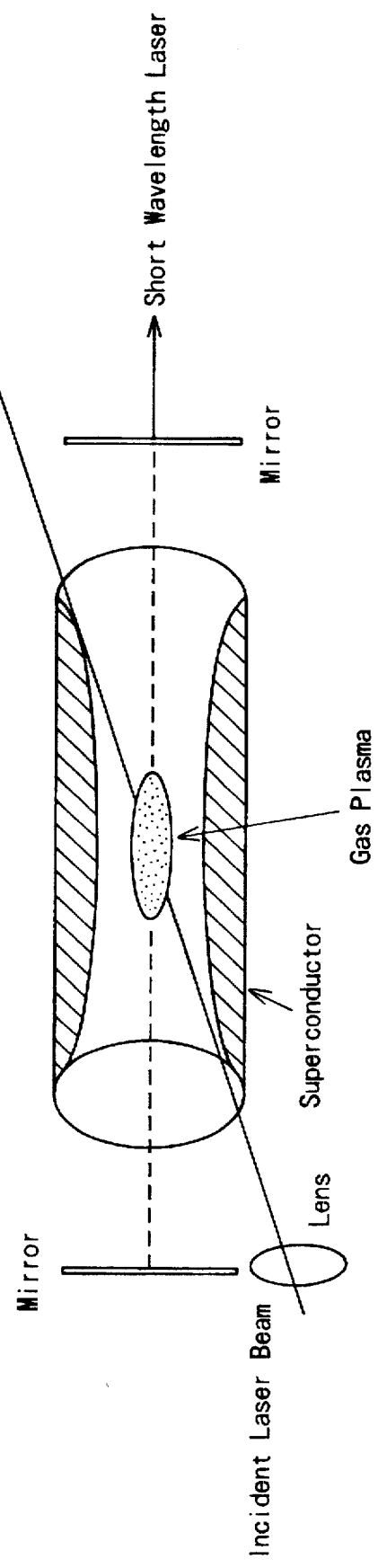
FIG. 3 is a conceptual diagram illustrating the high-efficiency plasma confining and the laser oscillator of the present invention when incorporating a mirror resonator.

FIG. 3 illustrates another embodiment of the high-efficiency plasma confining laser oscillator of the present invention when building a mirror oscillator. In this embodiment, the incident laser beam enters while slightly shifting from the optical axis. Since the oscillated short-wavelength laser resonates on the optical axis under the effect of the mirror, a gain of laser output is available.

Embodiment 4

Figure 4:
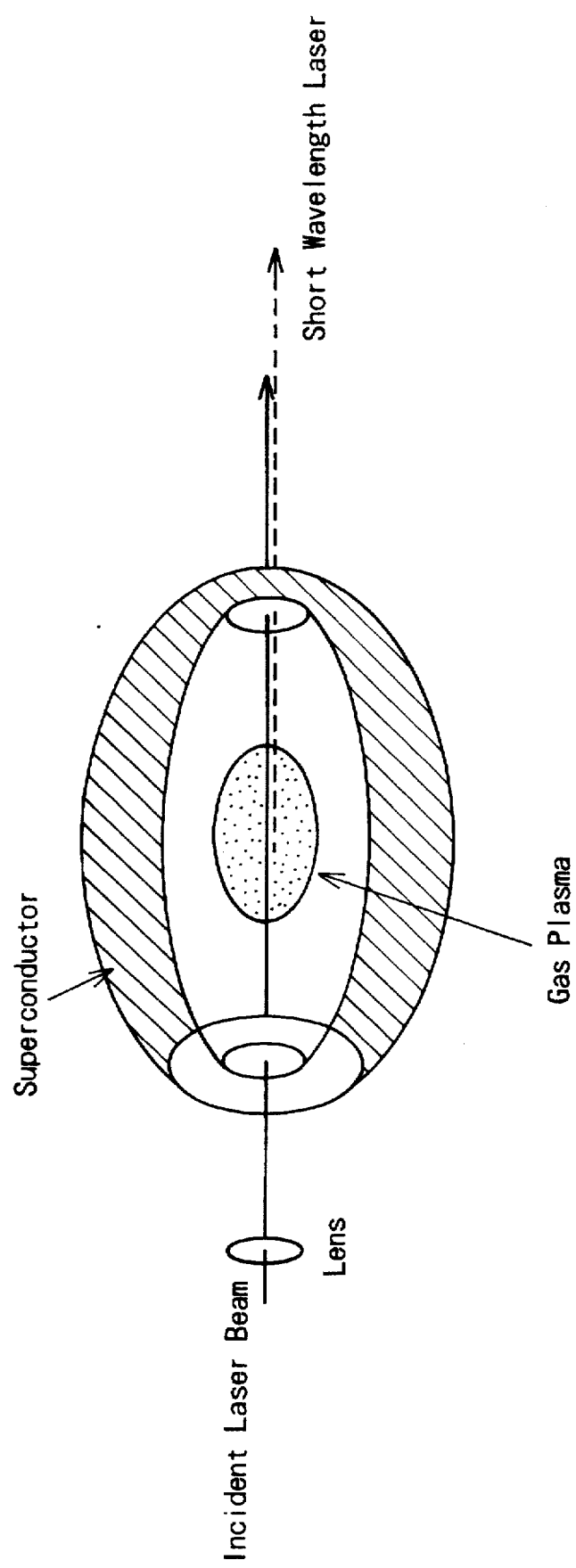
FIG. 4 is a conceptual diagram illustrating the high-efficiency plasma confining and the laser oscillator in a case where the inside diameter of the cylindrical superconductor is reduced at tho entry and the exit thereof.

FIG. 4 illustrates further another embodiment of the high-efficiency plasma confining laser oscillator of the present invention in a case where the inside diameter of the cylindrical superconductor is reduced at the entry and the exit. Axial expansion of the generated plasma can be more effectively inhibited by adopting this configuration.

Embodiment 5

Figure 5:
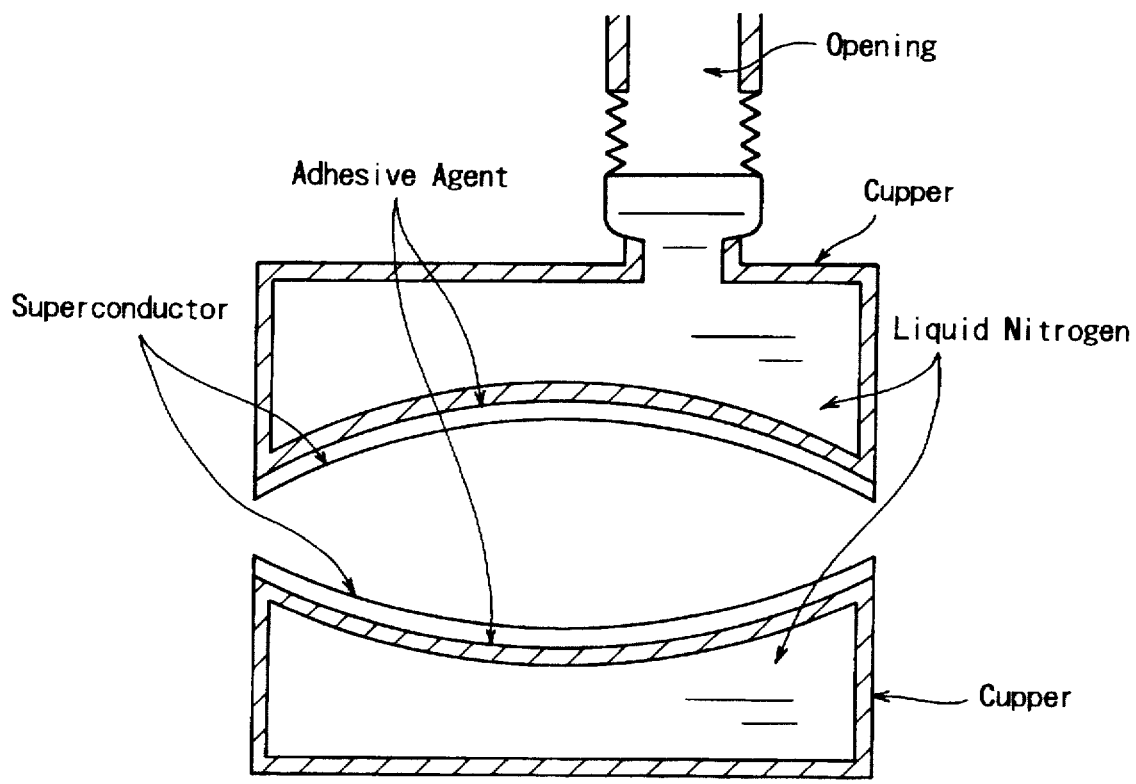
FIG. 5 is a schematic sectional view illustrating the configuration of a cooling section to accompany the cylindrical superconductor of the present invention.

The superconducting cylinder in the embodiments 1, 2, 3 and 4 is accompanied by a cooling section having a construction as shown in FIG. 5 (the configuration shown is a combination of the equipment shown in FIG. 4 and a cooling section). This is to obtain a superconducting effect. If a room-temperature superconductor is available, therefore, it is not necessary to provide a cooling section based on liquid nitrogen.

In the embodiment shown in FIG. 5, expression of the superconducting effect is accomplished by bonding a superconductor to the inner surface of a container-shaped copper cylinder with an epoxy resin adhesive excellent in electric conductivity, and performing cooling by introducing liquid nitrogen, for example, from the opening.

According to the present invention, as described above in detail, it is possible to stable conduct effective confining which has been difficult in the conventional confining methods. This effective confining permits achievement of a compact and simple high-efficiency short-wavelength laser oscillator.

It is needless to mention that confining of a plasma provides effect, not only on a high-density and high-temperature plasma, but also on a low-temperature plasma.

We claim:

1. A high-efficiency plasma confining method of confining a plasma generated by entering a laser beam via an entry of a superconducting cylinder within said cylinder, which comprises the step of inhibiting diffusion or expansion in the radial direction of said generated plasma by reducing the inside diameter of said cylinder between the entry and an exit thereof.

2. A high-efficiency plasma confining method of confining a plasma generated by entering a laser beam via an entry of a superconducting cylinder within said cylinder, which comprises the step of inhibiting diffusion or expansion in the axial direction of said generated plasma by reducing the inside diameter of said cylinder at the entry and at an exit thereof.

3. The method according to claim 1, which comprises the step of generating a magnetic line of force in the axial direction by winding a coil around the superconducting cylinder, thereby confining the plasma.

4. The method according to claim 2, which comprises the step of generating a magnetic line of force in the axial direction by winding a coil around the superconducting cylinder, thereby confining the plasma.

5. A laser oscillating method of oscillating a laser by confining a plasma generated by entering a laser beam via an entry of a superconducting cylinder within said cylinder, which comprises the step of inhibiting diffusion or expansion in the radial direction of said generated plasma by reducing the inside diameter of said cylinder between the entry and an exit thereof, thereby confining the plasma at a high efficiency.

6. The method according to claim 5, which comprises the step of generating a magnetic line of force in the axial direction by winding a coil around a superconducting cylinder, thereby confining a plasma.

7. A laser oscillating method of oscillating a laser by confining a plasma generated by entering a laser beam via an entry of a superconducting cylinder within said cylinder, which comprises the step of inhibiting diffusion or expansion in the axial direction of said generated plasma by reducing the inside diameter of said cylinder at the entry and at an exit thereof, thereby confining the plasma at a high efficiency.

8. The method according to claim 7, which comprises the step of generating a magnetic line of force in the axial direction by winding a coil around a superconducting cylinder, thereby confining a plasma.

9. A laser oscillator comprising a superconducting cylinder, supply means of a gas or a solid into said cylinder, and laser irradiating means, wherein the inside diameter of said cylinder is reduced between an entry and an exit thereof, or the inside diameter thereof is reduced at the entry and the exit thereof.

10. The laser oscillator according to claim 9, wherein a coil is wound around said superconducting cylinder, to form a mirror resonator.

11. The laser oscillator according to claim 9, wherein a mirror is arranged near each of the entry and the exit of said superconducting cylinder to form a mirror resonator.

12. The laser oscillator according to claim 10, wherein a mirror is arranged near each of the entry and the exit of said superconducting cylinder to form a mirror resonator.

* * * * *